US009671140B2

(12) United States Patent
Kruglick

(10) Patent No.: US 9,671,140 B2
(45) Date of Patent: Jun. 6, 2017

(54) HETEROGENEOUS ELECTROCALORIC EFFECT HEAT TRANSFER

(75) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 236 days.

(21) Appl. No.: 13/384,859

(22) PCT Filed: Sep. 21, 2011

(86) PCT No.: PCT/US2011/052577
§ 371 (c)(1),
(2), (4) Date: Jan. 19, 2012

(87) PCT Pub. No.: WO2013/043169
PCT Pub. Date: Mar. 28, 2013

(65) Prior Publication Data
US 2013/0067935 A1 Mar. 21, 2013

(51) Int. Cl.
F25B 21/02 (2006.01)
F25B 21/00 (2006.01)
(52) U.S. Cl.
CPC ........ *F25B 21/00* (2013.01); *F25B 2321/001* (2013.01); *Y02B 30/66* (2013.01)
(58) Field of Classification Search
CPC .......... F25B 21/00; F25B 21/02; F25D 23/12; B23P 15/00; H05K 7/20; F28F 7/00; H02N 11/00; B31K 31/02
(Continued)

(56) References Cited

U.S. PATENT DOCUMENTS 2,978,875 A 4/1961 Lackey et al.
4,673,030 A 6/1987 Basiulis
(Continued)

FOREIGN PATENT DOCUMENTS

CN 86101652 A 11/1986
CN 1237791 A 12/1999
(Continued)

OTHER PUBLICATIONS

McNeil, D.A., "Pressure Drop and Heat Transfer Distributions Around a Bundle of Plasma-Treated Tubes Condensing Dropwise," Department of Mechanical and Chemical Engineering, Heriot-Watt University, Dec. 1999.
(Continued)

*Primary Examiner* — Len Tran
*Assistant Examiner* — Harry Arant
(74) *Attorney, Agent, or Firm* — Maschoff Brennan

(57) ABSTRACT

Technologies are generally described herein for electrocaloric effect heat transfer devices, methods, and systems that may be effective to efficiently transfer and distribute thermal energy from a heat source utilizing coordinated application of out of phase electric signals to adjacent heat transfer stacks coupled with a thermal distribution layer. Some electrocaloric effect heat transfer stacks may include alternating layers of electrocaloric effect material and thermal rectifier material. The out of phase electric signals produce electric fields that bias the electrocaloric effect material of one heat transfer stack to a hot phase, emitting thermal energy, while biasing the electrocaloric effect material of an adjacent heat transfer stack to a cold phase, absorbing thermal energy. The thermal distribution layer allows for thermal energy from the material in the hot phase to be distributed to the material of the adjacent stack in the cold phase rather than back to the heat source.

15 Claims, 7 Drawing Sheets

(58) Field of Classification Search
USPC .............. 62/3.2, 3.1, 3.3, 3.7, 335; 136/203, 136/236.1; 165/96
See application file for complete search history.

(56) References Cited

U.S. PATENT DOCUMENTS

| | | | |
|---|---|---|---|
| 4,757,688 A * | 7/1988 | Basiulis et al. | 62/3.2 |
| 4,860,748 A * | 8/1989 | Chiurco | A61F 7/007 607/112 |
| 4,929,516 A | 5/1990 | Pryor et al. | |
| 5,040,381 A * | 8/1991 | Hazen | 62/3.2 |
| 5,229,566 A | 7/1993 | Alexandres | |
| 5,515,238 A * | 5/1996 | Fritz et al. | 361/704 |
| 5,690,849 A * | 11/1997 | DeVilbiss et al. | 219/497 |
| 6,105,381 A * | 8/2000 | Ghoshal | 62/259.2 |
| 6,285,079 B1 | 9/2001 | Kunikiyo | |
| 6,300,150 B1 * | 10/2001 | Venkatasubramanian | 438/27 |
| 6,556,752 B2 | 4/2003 | Fang et al. | |
| 6,588,215 B1 | 7/2003 | Ghoshal | |
| 6,711,904 B1 | 3/2004 | Law et al. | |
| 6,877,325 B1 | 4/2005 | Lawless | |
| 7,293,416 B2 | 11/2007 | Ghoshal | |
| 7,305,839 B2 | 12/2007 | Weaver, Jr. | |
| 7,421,845 B2 | 9/2008 | Bell | |
| 7,475,551 B2 | 1/2009 | Ghoshal | |
| 7,900,450 B2 | 3/2011 | Gurin | |
| 7,951,467 B2 | 5/2011 | Tsushima | |
| 8,869,541 B2 | 10/2014 | Heitzler et al. | |
| 2001/0023591 A1 | 9/2001 | Maeda et al. | |
| 2003/0033818 A1 | 2/2003 | Kucherov et al. | |
| 2005/0045702 A1 * | 3/2005 | Freeman et al. | 228/254 |
| 2005/0086948 A1 | 4/2005 | Milke-Rojo et al. | |
| 2005/0109041 A1 * | 5/2005 | Tanaka | F25B 21/04 62/3.7 |
| 2005/0269065 A1 | 12/2005 | Chen | |
| 2006/0092694 A1 | 5/2006 | Choi et al. | |
| 2006/0137359 A1 | 6/2006 | Ghoshal | |
| 2006/0139116 A1 * | 6/2006 | Niki et al. | 331/176 |
| 2006/0201161 A1 | 9/2006 | Hirai et al. | |
| 2007/0007613 A1 | 1/2007 | Wang et al. | |
| 2008/0303375 A1 | 12/2008 | Carver | |
| 2009/0139244 A1 * | 6/2009 | Ullo | F25B 21/02 62/3.6 |
| 2009/0258248 A1 | 10/2009 | Tsushima | |
| 2009/0293499 A1 | 12/2009 | Bell et al. | |
| 2009/0301541 A1 | 12/2009 | Watts | |
| 2009/0308081 A1 | 12/2009 | Ouyang et al. | |
| 2010/0037624 A1 * | 2/2010 | Epstein et al. | 62/3.1 |
| 2010/0096113 A1 | 4/2010 | Varanasi et al. | |
| 2010/0140772 A1 | 6/2010 | Lin et al. | |
| 2010/0175392 A1 | 7/2010 | Malloy et al. | |
| 2010/0212327 A1 | 8/2010 | Barve et al. | |
| 2010/0218511 A1 | 9/2010 | Rockenfeller | |
| 2010/0230653 A1 | 9/2010 | Chen | |
| 2010/0236258 A1 | 9/2010 | Heitzler et al. | |
| 2011/0016885 A1 | 1/2011 | Zhang et al. | |
| 2011/0063904 A1 | 3/2011 | Chang et al. | |
| 2011/0113791 A1 | 5/2011 | Kruglick | |
| 2011/0146308 A1 | 6/2011 | Casasanta | |
| 2011/0203839 A1 | 8/2011 | Iwamoto | |
| 2011/0309463 A1 | 12/2011 | Kruglick | |
| 2012/0055174 A1 | 3/2012 | Kruglick | |
| 2012/0267090 A1 | 10/2012 | Kruglick | |
| 2013/0067934 A1 | 3/2013 | Kruglick | |
| 2013/0067935 A1 | 3/2013 | Kruglick | |

FOREIGN PATENT DOCUMENTS

| | | |
|---|---|---|
| CN | 1992358 A | 7/2007 |
| CN | 2932237 Y | 8/2007 |
| CN | 101246947 A | 8/2008 |
| CN | 101291769 A | 10/2008 |
| CN | 101587934 A | 11/2009 |
| CN | 101842647 A | 9/2010 |
| EP | 0194475 A2 | 9/1986 |
| GB | 2420662 | 5/2006 |
| GB | 2420662 A | 5/2006 |
| JP | 1999177151 A * | 7/1999 |
| JP | H11177151 A | 7/1999 |
| WO | 2006056809 A1 | 6/2006 |
| WO | WO 2006056809 A1 * | 6/2006 |
| WO | 2008/137940 A1 | 11/2008 |
| WO | 2009126344 A2 | 10/2009 |

OTHER PUBLICATIONS

Kruglick, Ezekiel, U.S. Appl. No. 13/384,859, filed Jan. 19, 2012.
International Search Report dated Aug. 11, 2011 in PCT/US2010/039200.
U.S. Office Action dated Mar. 16, 2012 in U.S. Appl. No. 12/999,684.
Ashley, S., "Cool Polymers: Toward the Microwave Over Version of the Refrigerator," Scientific America Magazine Printed Apr. 7, 2009 [http://www.sciam.com/article.cfm?id=cool-polymers&print=true].
Mischenko, A. et al., "Giant Electrocaloric Effect in Thin-Film PPbZr0.95Ti0.05O3" Science, vol. 311 Downloaded Oct. 21, 2009 [www.sciencemag.org] Aug. 8, 2008, pp. 821-823.
Seim, H. et al., "Growth of LaCoO3 Thin Films from β-diketonate precursors," Applied Surface Science, vol. 112, 1997 pp. 243-250.
International Search Report and Written Opinion dated Oct. 15, 2012 in PCT/US2010/047013.
Vereshchagina, Elizaveta, "Investigation of Solid-State Cooler Based on Electrocaloric Effect," MS Thesis, 2007.
Sebald, G. et al., "Pyroelectric Energy Conversion: Optimization Principles," IEEE Transactions on Ultrasonics, Ferroelectrics, and Frequency Control, vol. 55, No. 3, Mar. 2008.
International Search Report dated Jun. 4, 2011 in PCT/US2011/033220.
International Search Report dated Dec. 20, 2011 in PCT/US2011/052569.
International Search Report dated Dec. 21, 2011 in PCT/US2011/052577.
Kobayashi, et al., "An Oxide Thermal Rectifier"; http://arxiv.org/abs/0910.1153; Oct. 7, 2009.
Peyrard, M., "The Design of a Thermal Rectifier"; Europhysics Letters vol. 76, No. 49; (2006).
Morita et al., "Ferroelectric Properties of an Epitaxial Lead Zirconate Titanate Thin Film Deposited by a Hydrothermal Method Below the Curie Temperature"; Applied Physics Letters, vol. 84, No. 25, Jun. 21, 2004.
Li et al., "Interface Thermal Resistance Between Dissimilar Anharmonic Lattices"; Physics Review Letters, vol. 95, 104302 (2005).
Fett, T. et al., "Nonsymmetry in the Deformation Behaviour of PZT," Journal of Materials Science Letters 17, No. 4, pp. 261-265 (1998) (Abstract only).
Terraneo et al., "Controlling the Energy Flow in Nonlinear Lattices: A Model for a Thermal Rectifier"; Physical Review Letters, vol. 88, No. 9, Mar. 4, 2002.
Akcay, G. et al., "Influence of mechanical boundary conditions on the electrocaloric properties of ferroelectric thin films," Journal of Applied Physics 103 (2008).
Epstein, R.I., "Photonic and Electronic Cooling," International Conference on Emerging Trends in Electronic and Photonic Devices & Systems, ELECTRO '09, Dec. 2009.
Neese, B. et al., "Large Electrocaloric Effect in Ferroelectric Polymers Near Room Temperature," Science 321, No. 5890, pp. 821-823 (2008) (Abstract only).
Dames, C., "Solid-State Thermal Rectification with Existing Bulk Materials," Journal of Heat Transfer 131, No. 6 (2009).
Waller, D. et al., "The effect of pulse duration and oxygen partial pressure on La0.7Sr0.3CoO3- and La0.7Sr0.3Co0.2Fe0.8O3-films prepared by laser ablation," Solid State Ionics, vol. 134, No. 1, Oct. 1, 2000, pp. 119-125(7).
U.S. Notice of Allowance dated Jan. 27, 2014 in U.S. Appl. No. 13/386,736.

(56) References Cited

OTHER PUBLICATIONS

U.S. Notice of Allowance dated Jan. 30, 2014 in U.S. Appl. No. 12/999,182.
"Heat Diode Paves the Way for Thermal Computing," Emerging Technology From the arXiv, accessed at http://www.technologyreview.com/view/415672/heat-diode-paves-the-way-for-thermal-computing/, Oct. 9, 2009, pp. 2.
"Themal Analysis of Semiconductor Systems," White Paper, Freescale Semiconductor, Inc., pp. 24 (2008).
Arik, M., at al., "Enhancement of Pool Boiling Critical Heat Flux in Dielectric Liquids by Microporous Coatings," International Journal of Heat and Mass Transfer, vol. 50, No. 5-6, pp. 997-1009 (2007).
International Search Report and Wntten Opinion for International Application No. PCT/US2012/055872 mailed on Nov. 20, 2012.
International Search Report for International Patent Application No. PCT/US2010/047887 mailed Nov. 12, 2010.
Kim, S.B., et al., "Thermal disturbance and its impact on reliability of phase-change memory studied by the micro-thermal stage," IEEE International Reliability Physics Symposium (IRPS), pp. 99-103 (2010).
Lencer, D., et al., "Design Rules for Phase-Change Materials in Data Storage Applications," Advanced Materials, vol. 23, Issue 18, pp. 2030-2058 (2011).
Salam, B., et al., "Pressure Drop Measurements in a Low Pressure Steam Condenser with a Horizontal Bundle of Staggered Tubes," Applied Thermal Engineering, vol. 24, Issue 8-9, pp. 1365-1379 (2004).
Servalli, G., "A 45nm Generation Phase Change Memory Technology," IEEE International Electron Devices Meeting, pp. 5.7.1-5.7.4 (2009).
Chinese First Office Action dated Apr. 7, 2015 as received in Application No. 201180073606.2.
Chinese First Office Action dated Apr. 9, 2015 as received in Application No. 201180073616.6.
International Preliminary Report on Patentability for PCT application No. PCT/US2010/039200 mailed on Dec. 19, 2012.
International Preliminary Report on Patentability for PCT application No. PCT/US2010/047887 mailed on Mar. 5, 2013.
International Preliminary Report on Patentability for PCT application No. PCT/US2011/052569 mailed on Mar. 25, 2014.
International Preliminary Report on Patentability for PCT application No. PCT/US2011/033220 mailed on Oct. 22, 2013.
International Preliminary Report on Patentability for PCT application No. PCT/US2011/052577 mailed on Mar. 25, 2014.
International Preliminary Report on Patentability for PCT application No. PCT/US2012/047013 mailed on Jan. 20, 2015.
Sinyavskii, Y. V., "Electrocaloric Refrigerators: A Promising Alternative to Current Low-Temperature Apparatus," Chemical and Petroleum Engineering, vol. 31, No. 6, pp. 295-306 (Jan. 1, 1995).
Supplementary European search report for EP2583320 mailed on dated Jan. 2, 2014.
Epstein et al., Electrocaloric Devices Based on Thin-Film Heat Switches, 2009 Journal of Applied Physics 106, 7pp.
Bai et al, Direct measurement of Giant Electrocaloric Effect in $BaTiO_3$ Multilayer Thick Film Structure Beyond Theoreticlal Prediction, 2010 Applied Physics Letters 96, 3pp.
Surana, R., "High Strain Functionally Graded Barium Titanate and its Mathematical Characterization," A dissertation submitted to the Division of Research and Advanced Studies of the University of Cincinnati, Sep. 27, 2004, pp. 1-104.
Lankford, K., "Spacecraft Thermal Control Handbook," Chapter 10, Heat Switches, 2002, pp. 353-371.
Sharpe, W.N. Jr. and Sharpe, W. I., "Springer Handbook of Experimental Solid Mechanics," Atomic Force Microscopy in Solid Mechanics, Part B, Chapter 17.2.5 PZT Actuator Nonlinearities, Dec. 4, 2008, pp. 420-423 (http://tinyurl.com/2bg6zkt).
U.S. Official Action dated Sep. 12, 2013 in U.S. Appl. No. 13/386,736.
U.S. Official Action dated Nov. 21, 2013 in U.S. Appl. No. 13/145,948.
U.S. Official Action dated Aug. 29, 2013 in U.S. Appl. No. 12/999,182.
International Search Report and Written Opinion dated Nov. 12, 2010 in PCT/US2010/047887.
U.S. Office Action dated Aug. 2, 2012 in U.S. Appl. No. 12/999,684.
Arik, Mehmet, "Enhancement of Pool Boiling Critical Heat Flux in Dielectric Liquids by Microporous Coatings," International Journal of Heat and Mass Transfer, 2007, pp. 997-1009, vol. 50.
Takeshi M., et al., "Ferroelectric properties of an epitaxial lead zirconate titanate thin film deposited by a hydrothermal method below the Curie temperature," Applied Physics Letters, vol. 84, Issue: 25, Jun. 21, 2004, pp. 5094-5096.
"Heat Diode Paves the Way for Thermal Computing," Technology Review, accessed at [http://www.technologyreview.com/blog/arxiv/24222/?a=f] Oct. 2009.
Arik, Mehmet, "Enhancement of Pool Boiling Critical Heat Flux in Dielectric Liquids," Doctoral Dissertation submitted to University of Minnesota, Feb. 2001.
Salam, et al., "Pressure Drop Measurements in a Low Pressure Steam Condenser with a Horizontal Bundle of Staggered Tubes," Applied Thermal Engineering, 2004, pp. 1365-1379, vol. 24.

\* cited by examiner

HETEROGENEOUS ELECTROCALORIC EFFECT HEAT TRANSFER

CROSS-REFERENCE TO RELATED APPLICATIONS

The present application is a U.S. National Stage filing under 35 U.S.C. §371 of International Application No. PCT/US2011/052577, filed on Sep. 21, 2011. This application is related to U.S. application Ser. No. 12/999,684, entitled "Electrocaloric Effect Materials and Thermal Diodes," filed on Dec. 17, 2010, now U.S. Pat. No. 9,508,913, which is a U.S. National Stage filing under 35 U.S.C. §371 of International Application No. PCT/US2010/039200, entitled, "Electrocaloric Effect Materials and Thermal Diodes," filed on Jun. 18, 2010. This application is further related to U.S. application Ser. No. 13/386,736, entitled "Electrocaloric Effect Heat Transfer Device Dimensional Stress Control," filed on Sep. 21, 2011, now U.S. Pat. No. 8,739,553, which is a U.S. National Stage filing under 35 U.S.C. §371 of International Application No. PCT/US2011/52569, entitled, "Electrocaloric Effect Heat Transfer Device Dimensional Stress Control," filed on Sep. 21, 2011. The disclosures of aforementioned applications and patents are herein incorporated by reference in their entirety.

BACKGROUND

Unless otherwise indicated herein, the materials described in this section are not prior art to the claims in this application and are not admitted to be prior art by inclusion in this section.

Electrocaloric effect materials are materials that can experience a temperature change when subjected to an applied voltage. This temperature change can be reversed upon the removal of the applied voltage. By physically coupling and decoupling electrocaloric effect material to and from a heat source, thermal energy can be dynamically transferred in quantities that are greater in one direction than the other. The described principles may be applied to a heat transfer device that can be utilized to transfer thermal energy away from a heat source.

The present disclosure appreciates that heat transfer devices utilizing electrocaloric effect materials may experience various performance inefficiencies. Specifically, while electrocaloric effect materials may absorb thermal energy upon the application of an electrical signal or voltage, this effect reverses when the voltage is removed. Thermal rectifier materials may be used to resist the backflow of thermal energy from adjacent electrocaloric effect material layers in the direction toward the source being cooled, however during cycles in which voltage is not applied to an electrocaloric effect material proximate to a heat source, thermal energy may be reabsorbed by the heat source, or at least not efficiently dissipated from the heat source. Consequently, a heat transfer device utilizing conventional electrocaloric effect materials may not operate with high efficiency in removing thermal energy from a heat source.

SUMMARY

The present disclosure generally describes techniques for electrocaloric effect heat transfer devices and methods that may be effective to increase operating efficiency of electrocaloric effect material heat transfer devices. According to some example embodiments, a heat transfer device may include multiple heat transfer stacks positioned adjacent to one another. Each heat transfer stack may include an electrocaloric effect material and a thermal rectifier material arranged in thermal contact with the electrocaloric effect material. A thermal distribution layer may be positioned between the heat transfer stacks and a heat source so that the thermal distribution layer can be in thermal contact with the first layer of each heat transfer stack and the heat source. The thermal distribution layer can be configured to transfer thermal energy from the heat source to the heat transfer stacks, as well as to transfer thermal energy between the adjacent heat transfer stacks.

The present disclosure also generally describes methods that may be employed to transfer thermal energy from a heat source. Some example methods may include applying an electric field in response to a first clock signal across first subset of heat transfer stacks. During the application of the electric field, thermal energy can be transferred from the heat source into the first subset of heat transfer stacks through a thermal distribution layer that is positioned between the heat source and heat transfer stacks. Following the application of the first electric field, a second electric field may be applied in response to a second clock signal across a second subset of heat transfer stacks. During application of the second electric field, thermal energy can be transferred into the second subset of heat transfer stacks through the thermal distribution layer.

The present disclosure further generally describes heat transfer systems. According to some example embodiments, a heat transfer system may include a number of heat transfer stacks arranged in an array having two or more subsets of heat transfer stacks. The first subset can be configured for operation with the application of an electric field in response to a first clock signal, while the second subset can be configured for operation with the application of a second electric field in response to a second clock signal that is substantially out of phase with respect to the first clock signal. Each heat transfer stack may include an electrocaloric effect material, electrodes adapted to apply the applicable electric field, and a thermal rectifier material arranged in thermal contact with the electrocaloric effect material. A thermal distribution layer can be thermally coupled to the heat transfer stacks and can be configured to thermally couple to a heat source effective to transfer thermal energy from the heat source to the heat transfer stacks.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
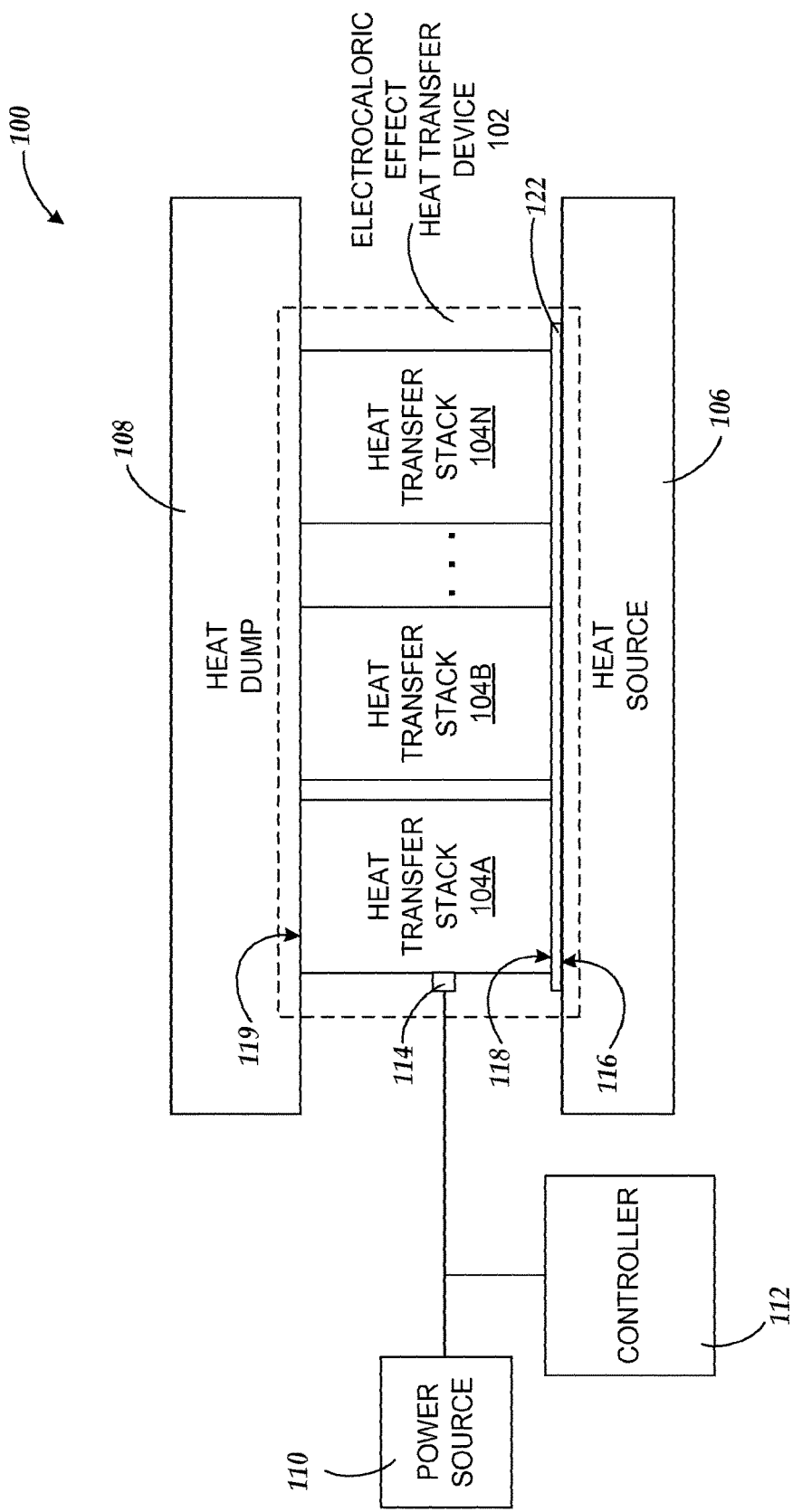
FIG. 1 is a functional block diagram illustrating an example electrocaloric effect heat transfer system utilizing an electrocaloric effect heat transfer device having multiple heat transfer stacks and a thermal distribution layer.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to electrocaloric effect heat transfer techniques utilizing a coordinated application of phased electric signals to adjacent heat transfer stacks coupled with a thermal distribution layer to effectively transfer and distribute thermal energy away from a source. For the purposes of this disclosure, a heat transfer device (or heat pump) may correspond to any device that utilizes the various heat transfer techniques described herein. In some illustrative implementations, an electrocaloric effect heat transfer device may be configured to utilize multiple adjacent (e.g., any number of rows and columns) heat transfer stacks. Each heat transfer stack may include alternating layers of electrocaloric effect material and thermal rectifier material. A thermal distribution layer can be positioned between the heat source and the heat transfer stack. The electric signals applied to the heat transfer stacks are substantially out of phase (e.g., about 180 degrees out of phase) with respect to one another, creating corresponding electric fields that bias the electrocaloric effect material in one heat transfer stack to a hot phase, emitting heat or thermal energy, while biasing the electrocaloric effect material in an adjacent heat transfer stack to a cold phase, absorbing heat or thermal energy. The thermal distribution layer allows for a significant portion of the thermal energy from the electrocaloric effect material layer in the hot phase to be distributed to the electrocaloric effect material layer of the adjacent heat transfer stack in the cold phase rather than transferring the thermal energy back to the heat source. Heat transfer efficiency may be significantly increased as a result of this described technique.

FIG. 1 is a functional block diagram illustrating an example electrocaloric effect heat transfer system 100 utilizing an electrocaloric effect heat transfer device 102 having multiple heat transfer stacks 104A-104N and a thermal distribution layer 122, arranged in accordance with at least some embodiments described herein. Heat transfer stacks 104A-104N may collectively be referred to as "104." As previously stated, each heat transfer stack 104 may include alternating layers of electrocaloric effect material and thermal rectifier material configured to transfer thermal energy from a heat source 106 to a heat dump 108. Each heat transfer stack 104 may include at least one electrocaloric effect material layer and one thermal rectifier layer, although any number of layers of both materials may be used within the scope of this disclosure.

According to various embodiments described herein, the electrocaloric effect heat transfer device 102 can be thermally coupled to the heat source 106 via a thermal distribution layer 122 of the electrocaloric effect heat transfer device 102. One surface 116 of the thermal distribution layer 122 may be thermally coupled to the heat source 106 to be cooled, while an opposing surface 118 of the thermal distribution layer 122 may be thermally coupled to a first layer of each of the heat transfer stacks 104. On an opposing end of the electrocaloric effect heat transfer device 102, a surface 119 of each of the heat transfer stacks 104 may be thermally coupled to a heat dump 108, which can transfer thermal energy from the heat source 106 through the electrocaloric effect heat transfer device 102.

The thermal distribution layer 122 of the electrocaloric effect heat transfer device 102 may include any material having a higher thermal conductivity than the heat source 106. Example materials suitable for the thermal distribution layer 122 include, but are not limited to, diamond, silver, gold, silicon, and various metals. The thermal distribution layer 122 may additionally be incorporated into the heat source 106 so that the heat source itself distributes thermal energy between adjacent heat transfer stacks 104 if the heat source 106 has a suitably high thermal conductivity. The thermal distribution layer 122 may be configured as thermal grease, gel, paste, or other solid or semisolid; thermally conductive adhesives and adhesive tapes; solder; copper or other metal plating; and thermally conductive shims. The thermal distribution layer 122 may additionally be configured as the substrate mounting for electronic circuits or as a thermal ground plane. The thermal distribution layer 122 will be discussed in greater detail below with respect to FIG. 4.

The electrocaloric effect heat transfer device 102 can be electrically coupled to a power source 110 via two or more sets of electrodes 114. It should be appreciated that although the electrodes 114 are represented in FIG. 1 as a single box or rectangle, implementations may include any number and type of electrodes 114 positioned appropriately throughout the electrocaloric effect heat transfer device 102 that are operable to subject the various electrocaloric effect material layers of the heat transfer stacks 104 to electrical fields provided by the power source 110. For example, as will be described in further detail below with respect to FIG. 2, each heat transfer stack 104 may include alternating layers of electrocaloric effect material and thermal rectifier material.

According to some implementations, two electrodes 114 may be positioned on opposing sides of the electrocaloric effect material layer, optionally encompassing an adjacent thermal rectifier material layer. The electrodes 114 are further described and illustrated in application serial number PCT/US2010/039200, entitled, "Electrocaloric Effect Materials and Thermal Diodes," filed on 18 Jun. 2010, and corresponding U.S. National Phase filing, U.S. application Ser. No. 12/999,684, entitled "Electrocaloric Effect Materials and Thermal Diodes," filed on 17 Dec. 2010, each of which is herein incorporated by reference in its entirety.

In some examples, an electrode control signal may be applied to the electrodes 114 from the power source 110 effective to generate an electric field across the associated electrocaloric effect material. The same or like electrode control signal may be applied substantially simultaneously to the electrodes 114 of every other electrocaloric effect material layer (e.g., alternating layers) within a heat transfer stack 104. As every second layer of electrocaloric effect material within a heat transfer stack 104 can be subjected to an electric field to produce a cold phase, the intervening layers of electrocaloric effect material are not substantially subjected to an electric field, which creates a hot phase in those layers. As the electrode control signal can be cyclically applied to the alternating layers of electrocaloric effect material, thermal energy can be transferred from the hot phase layers to the cold phase layers in a direction from the heat source 106 to the heat dump 108.

The electrode control signal may be any type of signal that is effective to produce the desired temperature change within the electrocaloric effect material and corresponding heat transferring action that may facilitate transfer of thermal energy away from the heat source 106. According to some implementations, the electrode control signal may be an oscillating signal such as a voltage or current. The oscillating signal may be provided as any of a variety of signal waveforms. In some examples, the oscillating signal may be provided as a pulsed signal with a direct current (DC) voltage or DC current of a specified amplitude that is pulsed on or off (or simply between an upper voltage and lower voltage) with a specified duty cycle and period. In some additional examples, the oscillating signal may be provided as a sinusoidal signal with an alternating current (AC) voltage or AC current of a specified amplitude, frequency, phase and DC offset. In still additional examples, the oscillating signal may be provided as a ramped or sawtooth signal with a specified amplitude, rate, period and DC offset. In still other examples, the oscillating signal may be provided as a triangular signal with a specified amplitude, first ramp rate (e.g., increasing), second ramp rate (e.g., decreasing), period, and DC offset. Additional waveforms or combinations of waveforms are also contemplated.

According to some implementations described herein, the electronic control signal provided to one subset of heat transfer stacks 104 is provided as a signal that is 180 degrees out of phase with the electronic control signal provided at the same time to an adjacent subset of heat transfer stacks 104. In doing so, a layer of electrocaloric effect material in the first subset of heat transfer stacks is in a hot phase, emitting thermal energy, while a corresponding layer in an adjacent heat transfer stack of the second subset is in the cold phase, absorbing thermal energy.

As stated above, at any given instant, alternating layers of electrocaloric effect material within a heat transfer stack 104 can alternate between cold and hot phases effective to transfer thermal energy through the stack. For the purposes of this disclosure, a "corresponding layer in an adjacent heat transfer stack" may refer to layers within adjacent heat transfer stacks that are similarly positioned within the stack. So when a first electrocaloric effect material layer closest to the thermal distribution layer is in a cold phase, the first electrocaloric effect material layer closest to the thermal distribution layer in an adjacent stack could be in a hot phase. In this manner, the electronic control signal provided to one subset of heat transfer stacks 104 can be provided as a signal that is 180 degrees out of phase with the electronic control signal provided at substantially the same time to an adjacent subset of heat transfer stacks 104. The thermal distribution layer allows for a significant portion of the thermal energy from the electrocaloric effect material layers in the hot phase to be distributed to the electrocaloric effect material layers of adjacent heat transfer stacks in the cold phase rather than transferring the thermal energy back to the heat source, which may increase the efficiency of the electrocaloric effect heat transfer device 102.

The electrocaloric effect heat transfer system 100 may include a controller 112 that is configured to operatively control the electrode control signal or signals applied to the electrodes 114 from the power source 110 to create the desired electric fields that drive the transfer of thermal energy through the system. The controller 112 may be configured to operatively control the application of the electrode control signal in two opposite phases to two subsets of heat transfer stacks 104. The controller 112 may include any type of controller device included but not limited to computer hardware and/or software capable of providing the electrode control signal at the desired waveform characteristics according to, inter alia, the applicable subset of heat transfer stacks 104. The controller 112 may be included as part of the electrocaloric effect heat transfer device 102, or may be an external component of the electrocaloric effect heat transfer system 100 as shown in FIG. 1. The controller 112, as arranged in accordance with at least some embodiments will be described in greater detail below with respect to FIG. 8.

It should be appreciated that the heat source 106 may be any electronic component, computer component, appliance, or any device that may generate or absorb thermal energy during operation. Similarly, the heat dump 108 may include any thermally conductive material such as a metal or metal alloy heat sink material. In some examples, the heat dump 108 may be comprised of a computer case or an electronics case that is thermally conductive material capable of receiving thermal energy from the electrocaloric effect heat transfer device 102 at any operating temperature of the heat source 106. Alternatively, rather than including a metal or other solid material, the heat dump 108 may include gas or liquid. In some implementations, the heat dump 108 may include both conductive material and liquid or gas such as a heat pipe apparatus where the inside of the heat pipe may be comprised of liquid/gas and the exterior of the heat pipe may be a metal alloy. Additional combinations of thermally conductive materials, liquids and gases are contemplated. Example thermally conductive materials may include, but are not limited to, aluminum, copper, silver, gold, platinum, tungsten, and other metal or metal alloys. Although less thermally conductive than the metal and metal alloys described above, other materials that are suitable for high temperatures, such as ceramics, are also contemplated. Example gases suitable for the present application may include air, nitrogen, helium, and other gases. Noncorrosive gases may be suitable for the present application, including multi-component gas mixtures such as a Helium-Xenon mixture. Example liquids suitable for the present application gases may include water, liquid nitrogen, liquid helium, ethylene glycol, alcohol, and ionic liquids.

Figure 2:
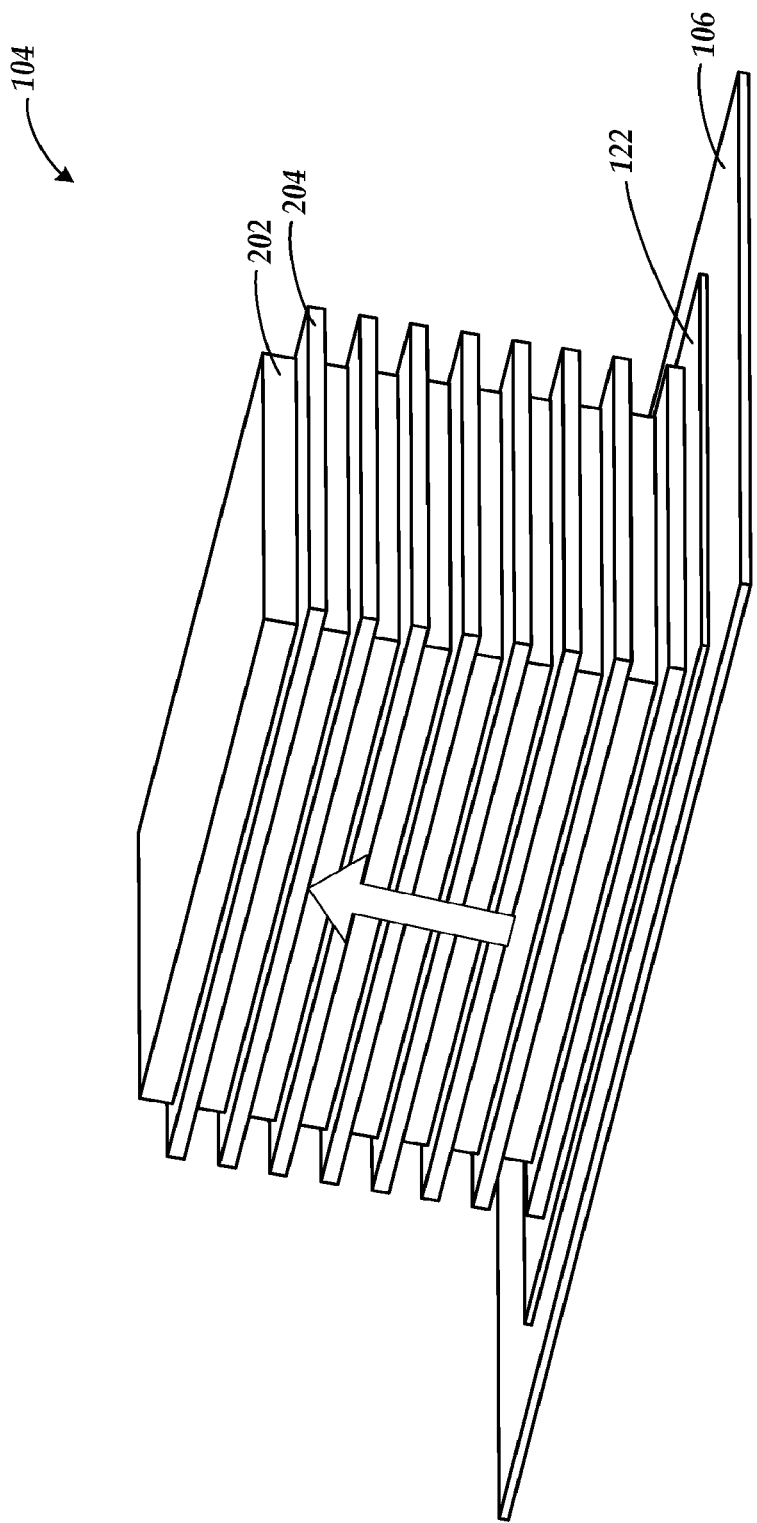
FIG. 2 is a perspective view of an example heat transfer stack of an electrocaloric effect heat transfer system.

FIG. 2 is a perspective view of an example heat transfer stack 104 of an electrocaloric effect heat transfer system 100, arranged in accordance with at least some embodiments described herein. The heat transfer stack 104 may be thermally coupled to a heat source 106. According to this example, the heat transfer stack 104 may include alternating layers of electrocaloric effect material 202 and thermal rectifier material 204. A layer of thermal rectifier material 204 may be positioned between the thermal distribution layer 122 and the first layer of electrocaloric effect material 202. As is seen more clearly in FIG. 4, a first surface of the thermal rectifier material 204 abuts a top surface of the thermal distribution layer 122, and an opposing second surface of the thermal rectifier material 204 abuts a surface of the first layer of electrocaloric effect material 202. The bottom surface of the thermal distribution layer 122 abuts a top surface of the heat source 106. In this manner, the first layer of electrocaloric effect material 202 is in indirect thermal contact with the heat source 106 and direct thermal contact with the thermal rectifier material 204. As an oscillating voltage or other electrode control signal can be supplied to the electrodes 114 coupled to the layers of electrocaloric effect material 202, a resulting electric field biases the electrocaloric effect material to facilitate the transfer of thermal energy away from the heat source 106 and through the layers of the heat transfer stack 104.

The electrocaloric effect material 202 may include any suitable electrocaloric effect material that can experience a temperature change upon an application of electronic control signal, such as an applied voltage, to create an electric field that biases the electrocaloric effect material to facilitate thermal energy transfer. The electrocaloric effect material 202 may be substantially homogenous throughout the various layers of a single heat transfer stack 104 in that each layer may include the same characteristics, including but not limited to the type of electrocaloric effect material, as well as the layer dimensions and shape. Alternatively, the electrocaloric effect material 202 layers may be heterogeneous in that they differ in any characteristics within a single heat transfer stack 104. According to some embodiments, heterogeneous heat transfer stacks 104 include combinations of expanding and contracting electrocaloric effect materials 202 in order to control the dimensional changes of a heat transfer stack 104 that may occur with the application or removal of the electric field. These and other stress control techniques are further described and illustrated in pending application serial number PCT/US11/52569, entitled, "Electrocaloric Effect Heat Transfer Device Dimensional Stress Control," filed on Sep. 21, 2011, which is herein incorporated by reference in its entirety.

The thermal rectifier material 204, which can also be referred to as a thermal diode, may have an asymmetrical thermal conductance characteristic where thermal energy may be transported more readily in one general direction than in another, as indicated by the open arrow in FIG. 2. Another way of stating the thermal energy transfer characteristic of the thermal rectifier material 204 is that the thermal rectifier material 204 may be configured to resist thermal energy transfer in a direction from the heat dump 108 to the heat source 106 after removal of the electric field from the corresponding heat transfer stack 104. Although for clarity purposes, each layer of the thermal rectifier material 204 is illustrated as a uniform sheet, it should be appreciated that according to various implementations, the thermal rectifier material 204 may include any quantity of uniform or non-uniform sheets of suitable materials having different temperature coefficients of thermal conductivity. The materials having different temperature coefficients of thermal conductivity may be configured in thermal contact with one another, or may utilize heat pipes, actuators, or any other implementation that can be adapted to allow thermal energy to more readily flow in one direction than the other. Moreover, similar to the electrocaloric effect material 202 discussed above within a single heat transfer stack 104, the thermal rectifier material 204 characteristics may be substantially homogenous throughout the various layers of a single heat transfer stack 104 in that each thermal rectifier material layer may include the same characteristics as other thermal rectifier material layers, including but not limited to the type of thermal rectifier material, as well as the layer dimensions and shape. Alternatively, the thermal rectifier material 204 layers may differ in any characteristics within a single heat transfer stack 104.

The precise characteristics of a single heat transfer stack 104 may vary according to the desired heat transfer performance for the particular implementation. For example, the electrocaloric effect material 202, the materials used within the thermal rectifier material 204, the positioning of the electrodes 114 and corresponding voltage application, and the method of creating a heat transfer stack 104 and associated layers may vary according to any number and type of heat transfer performance criteria associated with the particular implementation. These heat transfer stack characteristics and others are described in application serial number PCT/US2010/039200, entitled, "Electrocaloric Effect Materials and Thermal Diodes," filed on 18 Jun. 2010, and corresponding U.S. National Phase filing, U.S. application Ser. No. 12/999,684, entitled "Electrocaloric Effect Materials and Thermal Diodes," filed on 17 Dec. 2010, each of which is herein incorporated by reference in its entirety.

Figure 3:
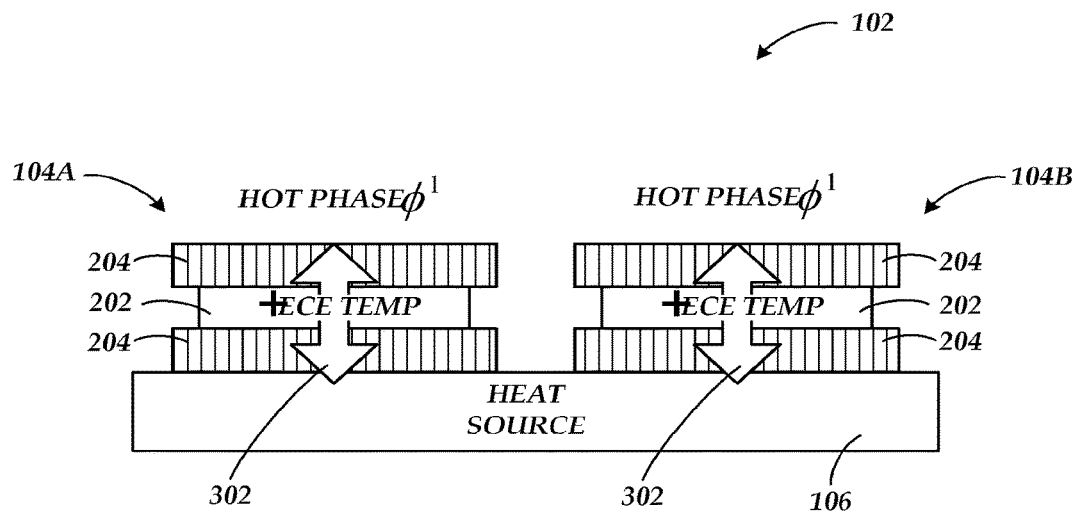
FIG. 3 is a side view of an example electrocaloric effect heat transfer device illustrating thermal energy transfer paths during a hot phase of an application of in-phase electric fields to adjacent heat transfer stacks in direct contact with a heat source.

FIG. 3 is a side view of an example electrocaloric effect heat transfer device 102 illustrating heat transfer paths 302 during a hot phase of an application of in-phase electric fields to adjacent heat transfer stacks 104 in direct contact with a heat source 106. For clarity, only two heat transfer stacks 104A and 104B are shown, and only one layer of electrocaloric effect material 202 with adjacent layers of thermal rectifier material 204 are shown for each heat transfer stack 104. It should be appreciated that although at least two adjacent heat transfer stacks are utilized within an electrocaloric effect heat transfer device 102 disclosed herein, any additional number of heat transfer stacks 104 may be used, with each heat transfer stack 104 having any number of layers of electrocaloric effect material 202 and thermal rectifier material 204.

Each layer of electrocaloric effect material 202 within a heat transfer stack 104 can be adapted to cycle between a hot phase in which the electrocaloric effect material 202 is emitting thermal energy and a cold phase in which the electrocaloric effect material 202 is absorbing thermal energy through the application of the electronic control signal and corresponding exposure to the electric field. By sequentially cycling between hot and cold phases throughout the layers of electrocaloric effect material 202 of a heat transfer stack 104, thermal energy may be generally transferred away from the heat source 106. Throughout the figures, the hot phase may be indicated by "+ECE TEMP" or phase one ("$\phi^1$"). Similarly, the cold phase may be indicated by "−ECE TEMP" or phase two ("$\phi^2$"). The cycling between phase one and phase two may be accomplished in various manners according to the type of electrode control signal provided.

For example, as discussed above, an oscillating voltage may be provided as a pulsed signal with a DC voltage of specified amplitude that is pulsed on or off (or in some examples simply between an upper voltage and lower voltage) with a specified duty cycle, pulse width, and period. In some additional examples, an oscillating voltage may be provided as a sinusoidal signal with an AC voltage of a specified amplitude, frequency, phase and DC offset. For the purposes of this disclosure, when DC voltage can be applied as the electrode control signal to create the electric field, the term "180 degrees out of phase" or "oppositely phased" may refer to the signal pulsed on (or to the first specified voltage level) for a first electrocaloric effect material 202 and a corresponding signal pulsed off (or the second specified voltage level) for a second electrocaloric effect material 202. When AC voltage is applied as the electrode control signal to create the electric field, the sinusoidal signal applied to the first electrocaloric effect material 202 may be approximately 180 degrees out of phase with respect to the sinusoidal signal simultaneously applied to the second electrocaloric effect material 202. Other signals may be considered 180 degrees out of phase when the application of the signal to the first electrocaloric effect material 202 initiates the hot phase in that material while the application of the signal to the second electrocaloric effect material 202 initiates the cold phase in that material. As described in further detail below, the application of the signals may be controlled utilizing a number of clock signals to ensure that the signals are properly phased.

It should be appreciated that while the embodiments may be described with respect to applying a signal that is 180 degrees out of phase, the exact phase offset is not critical to this disclosure. Rather, the various embodiments may be "substantially out of phase" in that the electrocaloric effect material 202 of one or more heat transfer stacks 104 are biased toward absorbing thermal energy while the electrocaloric effect material 202 of one or more adjacent heat transfer stacks 104 are biased toward emitting thermal energy. The precise timing of the signals may have an effect on the efficiency of the thermal energy transfer process, but is not limited to any particular value or range of values.

The open arrows on the heat transfer stacks 104 are shown to illustrate a general direction for the transfer of thermal energy, referred to as heat transfer paths 302, during that particular cycle or phase of the heat transfer operation. In the example shown in FIG. 3, the first layers of electrocaloric effect material 202 within each heat transfer stack 104A and 104B are both operating in the hot phase. Accordingly, the heat transfer paths 302 indicate that thermal energy is being emitted by the layers of electrocaloric effect material 202, a portion of which returns to the heat source 106. In this example, there is no intervening material such as a thermal distribution layer disposed between the first layer of thermal rectifier material 204 and the heat source 106. This backflow of thermal energy to the heat source 106 may limit the efficiency of the electrocaloric effect heat transfer device 102.

Figure 4:
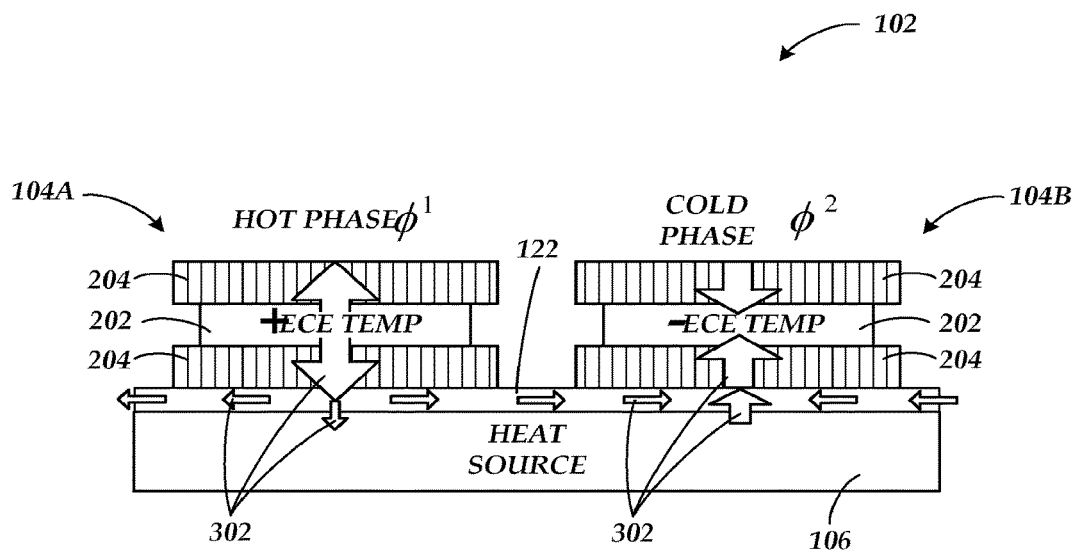
FIG. 4 is a side view of an example electrocaloric effect heat transfer device illustrating thermal energy transfer paths during an application of oppositely phased electric fields to adjacent heat transfer stacks in contact with the heat source via a thermal distribution layer.

In contrast, FIG. 4 shows a side view of an example electrocaloric effect heat transfer device 102 illustrating heat transfer paths 302 during an application of oppositely phased electric fields to adjacent heat transfer stacks 104 in contact with the heat source 106 via a thermal distribution layer 122, arranged in accordance with at least some embodiments described herein. In this example, the heat transfer stack 104A is operating in the hot phase, while the heat transfer stack 104B is simultaneously operating in the cold phase. A thermal distribution layer 122 is positioned between the first layers of the heat transfer stacks 104A and 104B and the heat source 106. As shown by the heat transfer paths 302, because the thermal distribution layer 122 has a higher thermal conductivity than the heat source 106, a significant portion of the thermal energy backflow from the electrocaloric effect material 202 of the heat transfer stack 104A in the hot phase is distributed throughout the thermal distribution layer 122 and absorbed by the electrocaloric effect material 202 of the heat transfer stack 104B in the cold phase. By spacing heat transfer stacks 104 closely together on the thermal distribution layer 122 and applying the electric field to adjacent heat transfer stacks 104 out of phase with respect to one another, the efficiency of the electrocaloric effect heat transfer system 100 can be significantly increased.

Figure 5:
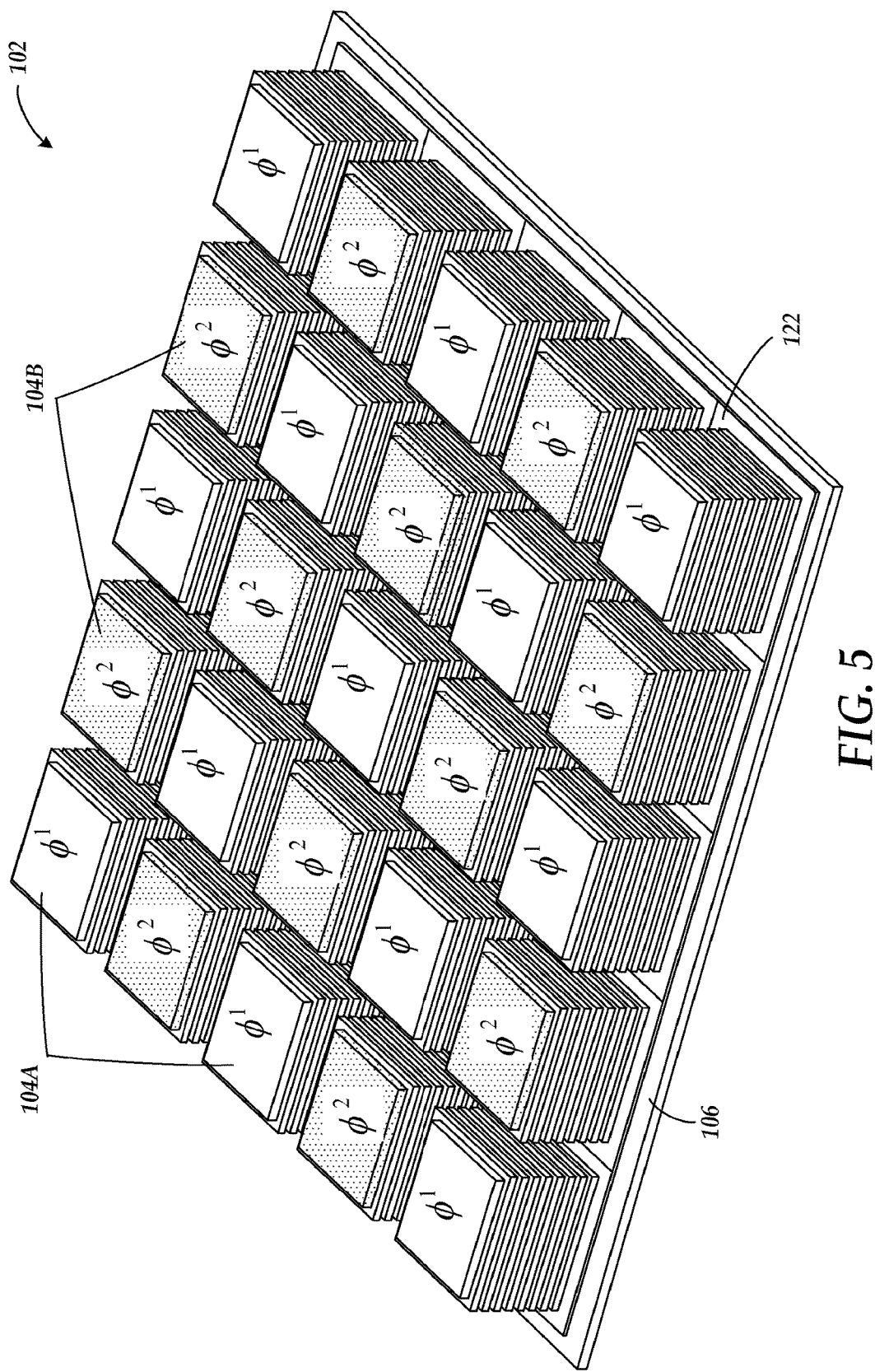
FIG. 5 is a perspective view of an example electrocaloric effect heat transfer device with an array of rectangular heat transfer stacks on a thermal distribution layer illustrating an oppositely phased electric field application pattern.

FIG. 5 is a perspective view of an example electrocaloric effect heat transfer device 102 with an array of rectangular heat transfer stacks 104 on a thermal distribution layer 122 illustrating an oppositely phased electric field application pattern, arranged in accordance with at least some embodiments described herein. According to this example, the rectangular array 500 of heat transfer stacks 104 includes two subsets of heat transfer stacks 104, specifically phase one heat transfer stacks 104A and phase two heat transfer stacks 104B, arranged in an alternating pattern in an array of rows and columns. With this implementation, the controller 112 may selectively control the application of the electric field from the power source 110 to the electrodes 114 associated with phase one heat transfer stacks 104A and to the electrodes 114 associated with the phase two heat transfer stacks 104B responsive to one or more clock signals. In particular, the clock signals may include two clock signals that are substantially 180 degrees out of phase with respect to one another.

As an example, the heat transfer process may begin with the controller 112 initiating the application of the electric field to the phase one heat transfer stacks 104A responsive to a first clock signal. This electric field can initiate the heat transfer with the phase one heat transfer stacks 104A, effectively transferring thermal energy from the heat source 106 and from the adjacent phase two heat transfer stacks 104B via the thermal distribution layer 122. Subsequently, the controller 112 can initiate the application of the electric field to the phase two heat transfer stacks 104B responsive to the second clock signal to initiate thermal energy transfer with the phase two heat transfer stacks 104B. The described selective control of the clock signals with heat transfer stacks can be utilized to facilitate effective transfer of thermal energy from the heat source 106 and from the adjacent phase one heat transfer stacks 104A via the thermal distribution layer 122. The process may continue to efficiently transfer thermal energy away from the heat source 106.

Figure 6:
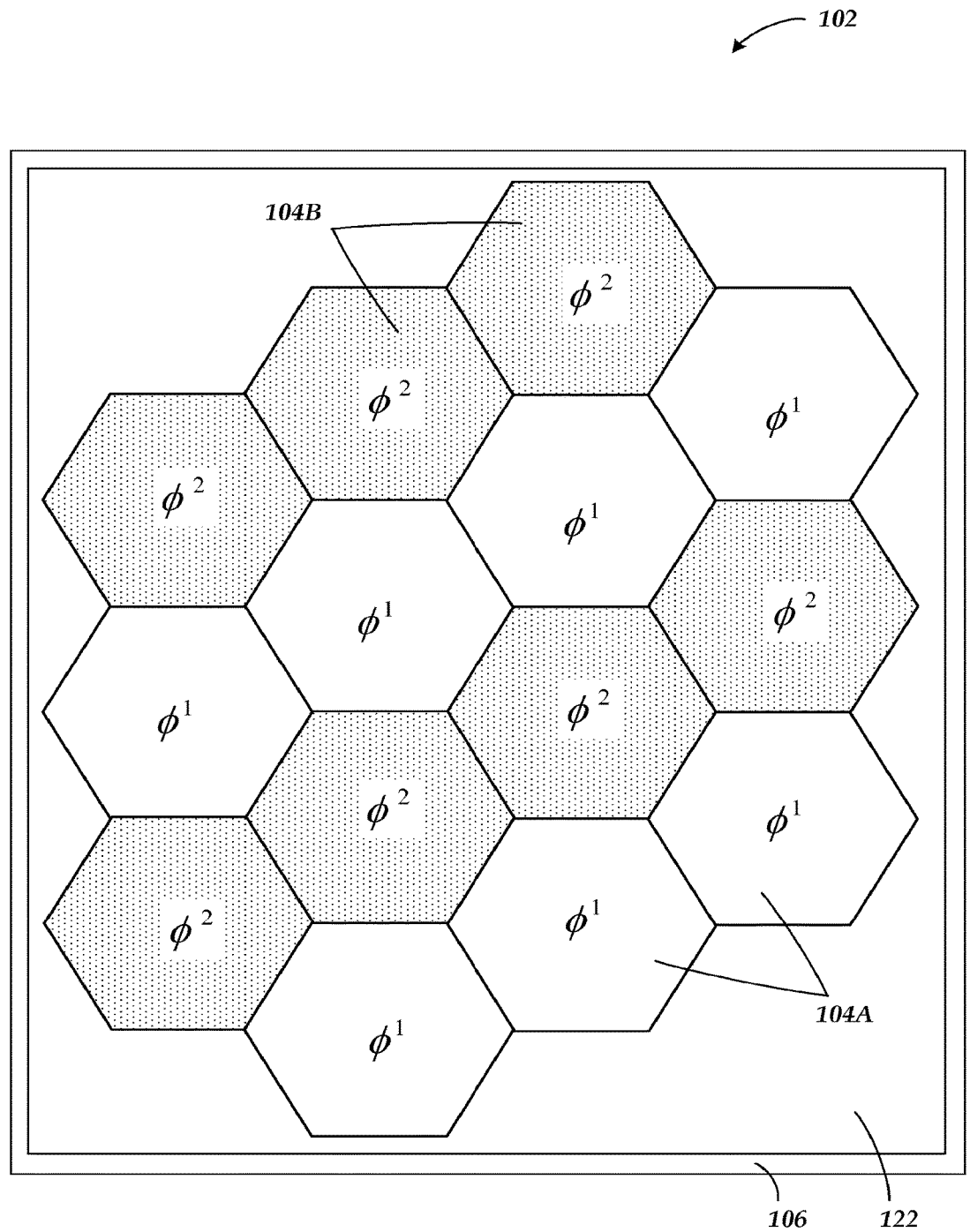
FIG. 6 is a top view of an example electrocaloric effect heat transfer device with an array of hexagonal heat transfer stacks on a thermal distribution layer illustrating an oppositely phased electric field application pattern.

FIG. 6 is a top view of an example electrocaloric effect heat transfer device 102 with an array of hexagonal heat transfer stacks 104 on a thermal distribution layer 122 illustrating an oppositely phased electric field application pattern, arranged in accordance with at least some embodiments described herein. As mentioned above, an electrocaloric effect heat transfer device 102 utilizing a thermal distribution layer 122 and out-of-phase signal application to subsets of the total number of heat transfer stacks 104 may benefit from a close spacing between the heat transfer stacks 104 due to an increased efficiency as backflow thermal energy from a heat transfer stack 104A in the hot phase may be more readily absorbed by an adjacent heat transfer stack 104B in the cold phase.

According to the configuration shown in FIG. 6, the heat transfer stacks have an equilateral polygonal shape as viewed from the top. In particular with the illustrated example, the heat transfer stacks 104 are hexagonal. The hexagonal shape may allow for a close spacing between adjacent heat transfer stacks 104. Utilizing the hexagonal configuration, each subset of heat transfer stacks 104 may be substantially arranged in alternating rows such that two opposing sides of the six-sided shape can be positioned to abut similarly phased heat transfer stacks 104, while the remaining four sides can be positioned to abut out of phase (e.g., 180-degree phased) heat transfer stacks 104. It should be understood that the disclosure provided herein is not limited to the rectangular and hexagonal heat transfer stacks 104 shown and described with respect to FIGS. 5 and 6. Rather, the heat transfer stacks 104 may be created and arranged according to any desired shape and size without departing from the scope of this disclosure.

Figure 7:
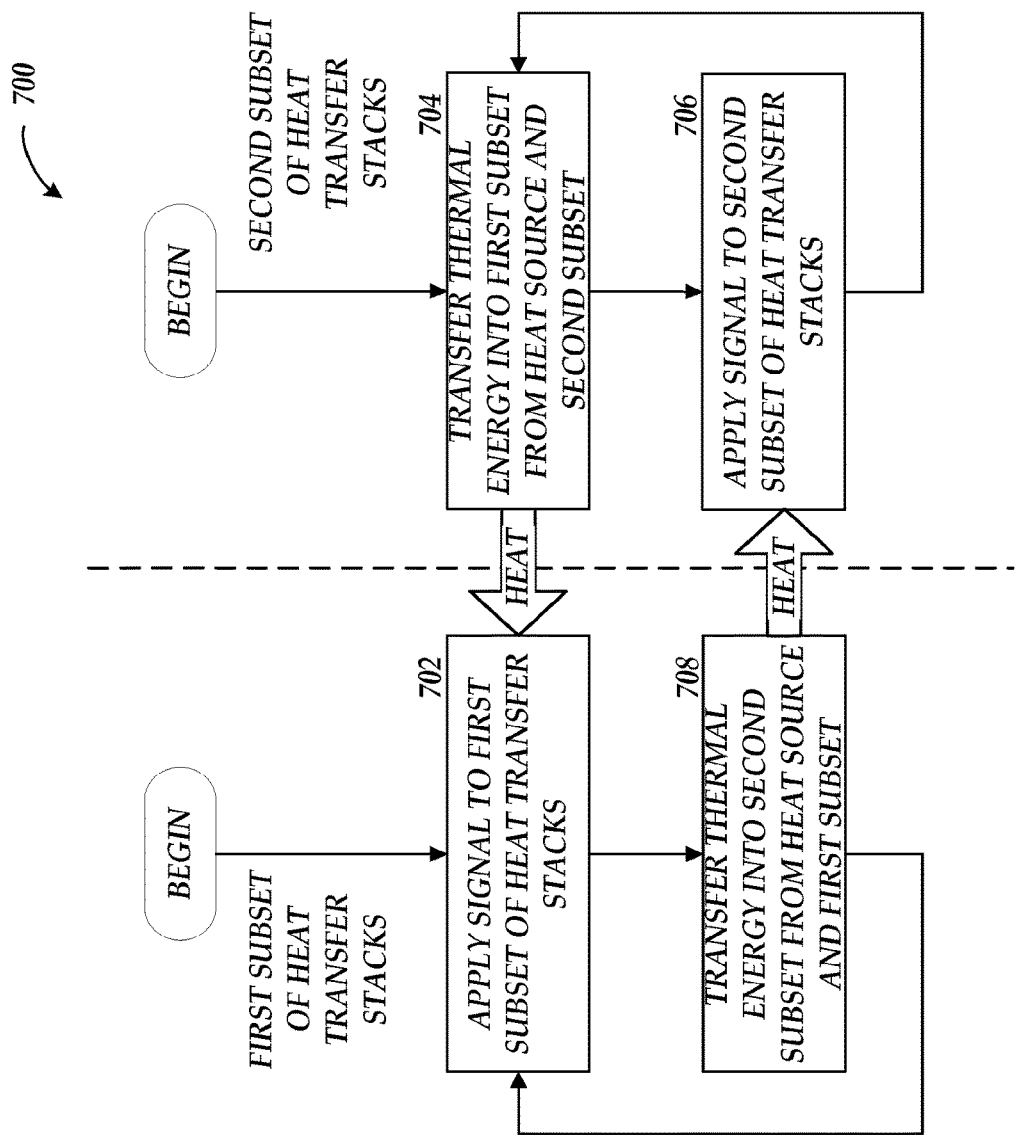
FIG. 7 is a flow diagram illustrating an example process for implementing an electrocaloric effect heat transfer device utilizing an oppositely phased application of electric fields.

FIG. 7 is a flow diagram illustrating an example process 700 for implementing an electrocaloric effect heat transfer device 102 utilizing an oppositely phased application of electric fields, in accordance with at least some embodiments described herein. The process 700 may include various operations, functions, or actions as illustrated by one or more of blocks 702-708. It should be appreciated that more or fewer operations may be performed than shown in the FIG. 7 and described herein. Moreover, these operations may also be performed in a different order than those described herein. It should be understood that the process 700 is shown as two separate but coordinated processes. The first is shown on the left side of the broken line corresponding to a first subset of heat transfer stacks 104. The second is shown on the right side of the broken line corresponding to a second subset of heat transfer stacks. The operations on each side of the broken line may occur substantially simultaneously with a corresponding operation on the opposite side of the broken line as will become clear during the discussion below.

The process 700 may begin at block 702 (Apply Signal to First subset of Heat Transfer Stacks), where the controller 112 may be configured to apply an electrode control signal to the applicable electrodes 114 of the first layers of electrocaloric effect material 202 of the first subset of heat transfer stacks 104. In the example given above in FIG. 4, this subset may include the phase two heat transfer stacks 104B since they are shown to be in the cold phase. While the signal is being applied to the phase two heat transfer stacks 104B at block 702, the first layers of electrocaloric effect material 202 of the second subset of heat transfer stacks 104 may be operated in the hot phase, effective such that these layers may facilitate backflow thermal energy to the thermal distribution layer 122. The process of providing backflow thermal energy and thermal energy from the heat source 106 via the thermal distribution layer 122 is depicted as block 704 (Transfer Thermal Energy into First Subset from Heat Source and Second Subset). Block 702 may be followed by block 708 and block 704 may be substantially simultaneously followed by block 706.

At block 706 (Apply Signal to Second Subset of Heat Transfer Stacks), the controller 112 may configured to apply an electrode control signal to the applicable electrodes 114 of the first layers of electrocaloric effect material 202 of the second subset of heat transfer stacks 104. In doing so, the second subset of heat transfer stacks 104 can transition from the hot phase to the cold phase. The signal applied to initiate this transition may be approximately 180 degrees out of phase from the signal provided to the first subset of heat transfer stacks 104 at block 702. Due to the phase shift in the signal applied to the heat transfer stacks 104, while the second subset of heat transfer stacks 104 transitions from the hot phase to the cold phase, at block 708 (Transfer Thermal Energy into Second Subset from Heat Source and First Subset), the first subset of heat transfer stacks 104 transitions from the cold phase to the hot phase. During the hot phase, thermal energy can be transferred from the heat source 106 and from the heat transfer stacks 104 in the first subset to the thermal distribution layer 122 where the thermal energy is received by the second subset of heat transfer stacks. As the controller 112 again shifts the signal about 180 degrees in phase, the process 700 can return to blocks 702 and 704 and repeats until heat transfer from the heat source 106 is no longer needed and/or the electrocaloric effect heat transfer device 102 is deactivated.

Figure 8:
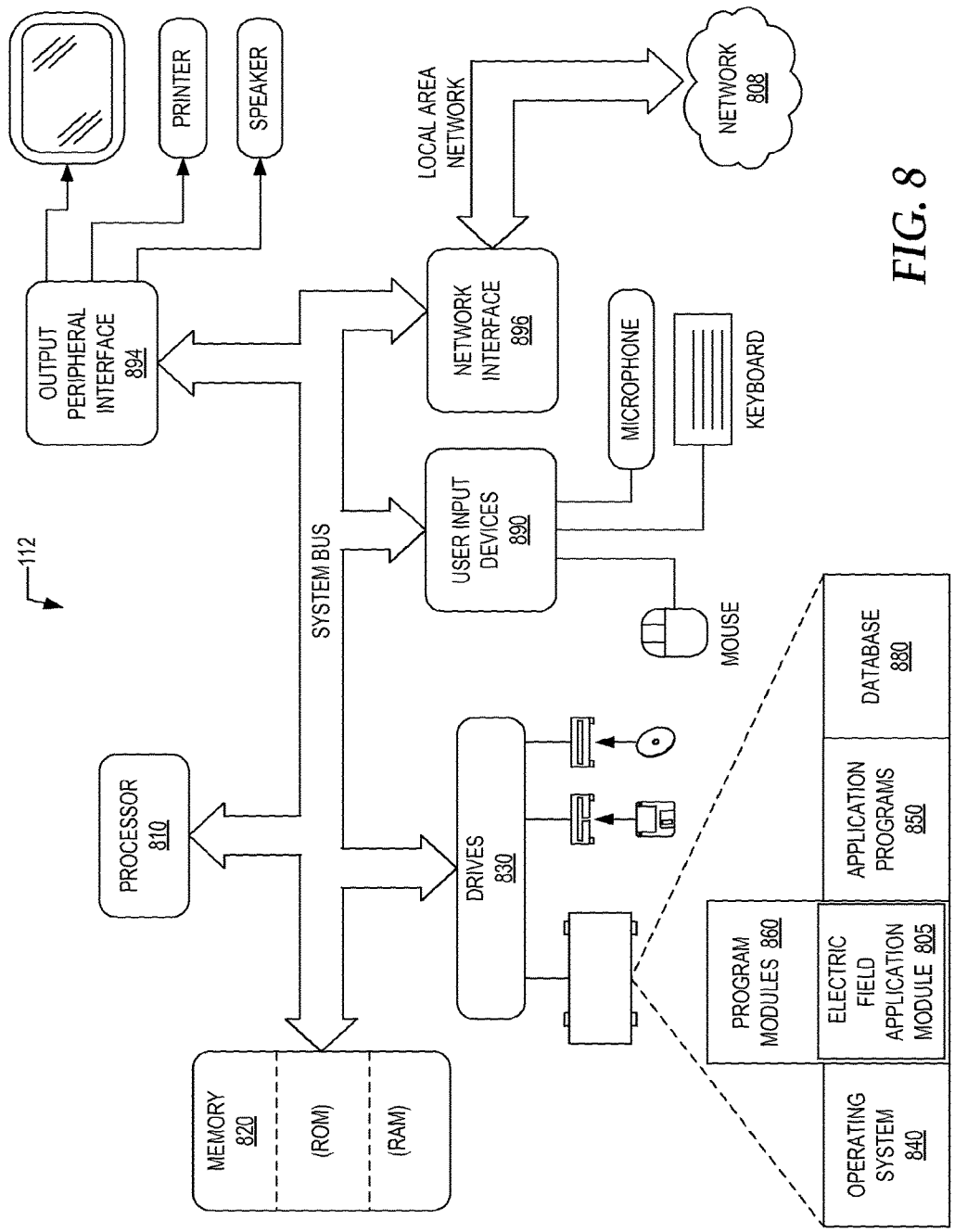
FIG. 8 is a block diagram illustrating a computer hardware architecture corresponding to an example controller, all arranged in accordance with at least some embodiments described herein.

FIG. 8 is a block diagram illustrating a computer hardware architecture that may correspond to an example controller 112 configured in accordance with at least some embodiments presented herein. FIG. 8 includes a controller 112, including a processor 810, memory 820 and one or more drives 830. The controller 112 may be implemented as a conventional computer system, an embedded control computer, a laptop, or a server computer, a mobile device, a set-top box, a kiosk, a vehicular in formation system, a mobile telephone, a customized machine, or other hardware platform.

The drives 830 and their associated computer storage media, provide storage of computer readable instructions, data structures, program modules and other data for the controller 112. The drives 830 can include an operating system 840, application programs 850, program modules 860, and a database 880. The program modules 860 may include an electric field application module 805. The electric field application module 805 may be adapted to execute the process 700 for implementing an electrocaloric effect heat transfer device 102 to coordinate the cold and hot phases of adjacent heat transfer stacks 104 to efficiently remove thermal energy from the heat source 106 as described in greater detail above (e.g., see previous description with respect to one or more of FIGS. 1-7). The controller 112 may further include user input devices 890 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 810 through a user input interface that is coupled to a system bus, but may be coupled by other interface and bus structures, such as a parallel port, game port or a universal serial bus ("USB"). Computers such as the controller 112 may also include other peripheral output devices such as speakers, which may be coupled through an output peripheral interface 894 or the like.

The controller 112 may operate in a networked environment using logical connections to one or more computers, such as a remote computer coupled to a network interface 896. The remote computer may be a personal computer, a server, a router, a network PC, a peer device or other common network node, and can include many or all of the elements described above relative to the controller 112. Networking environments are commonplace in offices, enterprise-wide area networks ("WAN"), local area networks ("LAN"), intranets, and the Internet.

When used in a LAN or WLAN networking environment, the controller 112 may be coupled to the LAN through the network interface 896 or an adapter. When used in a WAN networking environment, the controller 112 typically includes a modem or other means for establishing communications over the WAN, such as the Internet or the network 808. The WAN may include the Internet, the illustrated network 808, various other networks, or any combination thereof. It will be appreciated that other mechanisms of establishing a communications link, ring, mesh, bus, cloud, or network between the computers may be used.

According to some embodiments, the controller 112 may be coupled to a networking environment. The controller 112 may include one or more instances of a physical computer-readable storage medium or media associated with the drives 830 or other storage devices. The system bus may enable the processor 810 to read code and/or data to/from the computer-readable storage media. The media may represent an apparatus in the form of storage elements that arc implemented using any suitable technology, including but not limited to semiconductors, magnetic materials, optical media, electrical storage, electrochemical storage, or any other such storage technology. The media may represent components associated with memory 820, whether characterized as RAM, ROM, flash, or other types of volatile or nonvolatile memory technology. The media may also represent secondary storage, whether implemented as the storage drives 830 or otherwise. Hard drive implementations may be characterized as solid state, or may include rotating media storing magnetically-encoded information.

The storage media may include one or more program modules 860. The program modules 860 may include software instructions that, when loaded into the processor 810 and executed, transform a general-purpose computing system into a special-purpose computing system. As detailed throughout this description, the program modules 860 may provide various tools or techniques by which the controller 112 may participate within the overall systems or operating environments using the components, logic flows, and/or data structures discussed herein.

The processor 810 may be constructed from any number of transistors or other circuit elements, which may individually or collectively assume any number of states. More specifically, the processor 810 may operate as a state machine or finite-state machine Such a machine may be transformed to a second machine, or specific machine by loading executable instructions contained within the program modules 860. These computer-executable instructions may transform the processor 810 by specifying how the processor 810 transitions between states, thereby transforming the transistors or other circuit elements constituting the processor 810 from a first machine to a second machine The states of either machine may also be transformed by receiving input from the one or more user input devices 890, the network interface 896, other peripherals, other interfaces, or one or more users or other actors. Either machine may also transform states, or various physical characteristics of various output devices such as printers, speakers, video displays, or otherwise.

Encoding the program modules 860 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 860 may transform the physical state of the semiconductor memory 820 when the software is encoded therein. For example, the software may transform the state of transistors, capacitors, or other discrete circuit elements constituting the semiconductor memory 820.

As another example, the storage media may be implemented using magnetic or optical technology such as drives 830. In such implementations, the program modules 860 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A heat transfer device adapted to transfer thermal energy from a heat source, the heat transfer device comprising:

a plurality of adjacent heat transfer stacks configured to facilitate transfer of thermal energy between the plurality of adjacent heat transfer stacks, wherein:
  each heat transfer stack of the plurality of adjacent heat transfer stacks includes a plurality of interposed layers of electrocaloric effect material and thermal rectifier material arranged in thermal contact with one another;
  a last layer of the plurality of interposed layers is arranged in thermal contact with a heat dump;
  the plurality of adjacent heat transfer stacks includes heat transfer stacks of a first subset and heat transfer stacks of a second subset;
  the heat transfer stacks of the first subset and the heat transfer stacks of the second subset are alternately arranged in a pattern;
  each of the plurality of adjacent heat transfer stacks includes even layers of the electrocaloric effect material that alternate with odd layers of the electrocaloric effect material;
  the plurality of adjacent heat transfer stacks are arranged in the pattern in a plurality of rows and a plurality of columns;
  each of the plurality of rows includes multiple heat transfer stacks of the first subset and multiple heat transfer stacks of the second subset; and
  each of the plurality of columns includes multiple heat transfer stacks of the first subset and multiple heat transfer stacks of the second subset;
a thermal distribution layer arranged in thermal contact with a first odd layer of each of the plurality of adjacent heat transfer stacks, wherein the thermal distribution layer has a higher thermal conductivity than a thermal conductivity of a heat source, wherein the thermal distribution layer is configured to transfer thermal energy from the heat source, which is in contact with the thermal distribution layer, to the plurality of adjacent heat transfer stacks and also configured to transfer thermal energy between the plurality of adjacent heat transfer stacks;
first electrodes positioned to apply an electric field across the odd layers of the electrocaloric effect material of each heat transfer stack of the first subset and across the even layers of the electrocaloric effect material of each heat transfer stack of the second subset;
second electrodes positioned to apply an electric field across the odd layers of the electrocaloric effect material of each heat transfer stack of the second subset and across the even layers of the electrocaloric effect material of each heat transfer stack of the first subset; and
a controller operative to selectively control application of the electric field from a power source to the first electrodes and the second electrodes responsive to one or more of a plurality of clock signals,
wherein the plurality of clock signals comprises two clock signals that are substantially out of phase with respect to one another,
wherein the controller is configured to initiate application of the electric field to the first electrodes responsive to the first clock signal to initiate transfer of thermal energy with the even layers of the electrocaloric effect material of each heat transfer stack of the second subset and with the odd layers of the electrocaloric effect material of each heat transfer stack of the first subset, and
wherein the controller is configured to initiate application of the electric field to the second electrodes responsive to the second clock signal to initiate transfer of thermal energy with the even layers of the electrocaloric effect material of each heat transfer stack of the first subset and with the odd layers of the electrocaloric effect material of each heat transfer stack of the second subset.

2. The heat transfer device of claim 1, wherein each heat transfer stack of the plurality of adjacent heat transfer stacks has an equilateral polygonal shape.

3. The heat transfer device of claim 2, wherein the equilateral polygonal shape is a hexagonal shape.

4. The heat transfer device of claim 1, wherein the electric field is generated from a signal that comprises one or more of: a ramped signal, a sawtooth signal, or a triangular signal.

5. The heat transfer device of claim 1, wherein the thermal distribution layer comprises either a solid material or a semisolid material.

6. The heat transfer device of claim 1, wherein the electric field is generated from a signal that comprises an oscillating signal.

7. The heat transfer device of claim 1, wherein:
within each of the plurality of rows, heat transfer stacks of the first subset alternate every other one with heat transfer stacks of the second subset; and
within each of the plurality of columns, heat transfer stacks of the first subset alternate every other one with heat transfer stacks of the second subset.

8. A heat transfer system, comprising:
a plurality of heat transfer stacks arranged in an array with a plurality of rows and a plurality of columns, wherein the plurality of heat transfer stacks includes heat transfer stacks of a first subset and heat transfer stacks of a second subset, the first subset coupled to a first group of electrodes for application of a first electric field in response to a first clock signal, and the second subset coupled to a second group of electrodes for application of a second electric field in response to a second clock signal out of phase from the first clock signal,
wherein each heat transfer stack of the plurality of heat transfer stacks comprises an electrocaloric effect material and a thermal rectifier material arranged in thermal contact with the electrocaloric effect material;
a controller operative to initiate application of the first electric field to the first subset in response to the first clock signal and to initiate application of the second electric field to the second subset in response to the second clock signal, wherein the first and second clock signals are substantially out of phase with one another; and
a thermal distribution layer thermally coupled to the plurality of heat transfer stacks and configured to thermally couple to a heat source for transfer of thermal energy from the heat source to the plurality of heat transfer stacks and for transfer of thermal energy from heat transfer stacks of the plurality of heat transfer stacks that operate in a hot phase to adjacent heat transfer stacks of the plurality of heat transfer stacks that operate in a cold phase, wherein:
the thermal distribution layer has a higher thermal conductivity than a thermal conductivity of the heat source;
each of the plurality of rows of the array includes multiple heat transfer stacks of the first subset and multiple heat transfer stacks of the second subset;
each of the plurality of columns of the array includes multiple heat transfer stacks of the first subset and multiple heat transfer stacks of the second subset;
the thermal rectifier material of each heat transfer stack is coupled between the thermal distribution layer and the electrocaloric effect material of each heat transfer stack; and
the thermal rectifier material of each heat transfer stack is configured to permit transfer of thermal energy backflow from the electrocaloric effect material through the thermal rectifier material towards the heat source.

9. The heat transfer system of claim 8, wherein each heat transfer stack of the plurality of heat transfer stacks comprises a hexagonal shape.

10. The heat transfer system of claim 8, wherein the first electric field and the second electric field is each generated from a signal that comprises one of: a ramped signal, a sawtooth signal, or a triangular signal.

11. The heat transfer system of claim 10, wherein the thermal distribution layer comprises a solid or semisolid material.

12. The heat transfer system of claim 8, wherein the first electric field and the second electric field are each generated from a signal that comprises an oscillating signal.

13. The heat transfer system of claim 8, wherein:
within each of the plurality of rows of the array, heat transfer stacks of the first subset alternate every other one with heat transfer stacks of the second subset; and
within each of the plurality of columns of the array, heat transfer stacks of the first subset alternate every other one with heat transfer stacks of the second subset.

14. A heat transfer system, comprising:
a plurality of heat transfer stacks arranged in an array having two subsets of the plurality of heat transfer stacks, a first subset coupled to a first group of electrodes for application of a first electric field in response to a first clock signal, and a second subset coupled to a second group of electrodes for application of a second electric field in response to a second clock signal out of phase from the first clock signal,
wherein each heat transfer stack of the plurality of heat transfer stacks comprises an electrocaloric effect material and a thermal rectifier material arranged in thermal contact with the electrocaloric effect material, wherein the heat transfer stacks of the first subset and the second subset are arranged in an alternating pattern;
a controller operative to initiate application of the first electric field to the first subset of the plurality of heat transfer stacks in response to the first clock signal and to initiate application of the second electric field to the second subset of the plurality of heat transfer stacks in response to the second clock signal, wherein the first and second clock signals are substantially out of phase with one another; and
a thermal distribution layer thermally coupled to the plurality of heat transfer stacks and configured to thermally couple to a heat source for transfer of thermal energy from the heat source to the plurality of heat transfer stacks and for transfer of thermal energy from heat transfer stacks of the plurality of heat transfer stacks that operate in a hot phase to adjacent heat transfer stacks of the plurality of heat transfer stacks that operate in a cold phase, wherein:
the thermal distribution layer has a higher thermal conductivity than a thermal conductivity of the heat source;
each heat transfer stack of the plurality of heat transfer stacks comprises a hexagonal shape;

the alternating pattern includes rows of heat transfer stacks of the first subset that alternate with rows of heat transfer stacks of the second subset;

two opposite sides of the hexagonal shape of each heat transfer stack of the first subset are positioned to abut two heat transfer stacks of the first subset in a same row of heat transfer stacks of the first subset and four other sides of the hexagonal shape of each heat transfer stack of the first subset are positioned to abut four heat transfer stacks of the second subset in two adjacent rows of heat transfer stacks of the second subset; and two opposite sides of the hexagonal shape of each heat transfer stack of the second subset are positioned to abut two heat transfer stacks of the second subset in a same row of heat transfer stacks of the second subset and four other sides of the hexagonal shape of each heat transfer stack of the second subset are positioned to abut four heat transfer stacks of the first subset in two adjacent rows of heat transfer stacks of the second subset.

15. A heat transfer device adapted to transfer thermal energy from a heat source, the heat transfer device comprising:

a plurality of adjacent heat transfer stacks configured to facilitate transfer of thermal energy between the plurality of adjacent heat transfer stacks, wherein each heat transfer stack of the plurality of heat transfer stacks includes a plurality of interposed layers of electrocaloric effect material and thermal rectifier material arranged in thermal contact with one another, wherein a last layer of the plurality of interposed layers is arranged in thermal contact with a heat dump, wherein the plurality of adjacent heat transfer stacks includes heat transfer stacks of a first subset and heat transfer stacks of a second subset, wherein the heat transfer stacks of the first subset and the heat transfer stacks of the second subset are alternately arranged in a pattern, wherein each of the plurality of adjacent heat transfer stacks includes a first layer and a second layer of the electrocaloric effect material in which the first layer of the electrocaloric effect material is closer to the heat source than the second layer of the electrocaloric effect material;

a thermal distribution layer arranged in thermal contact with a first layer of one or more of the plurality of adjacent heat transfer stacks, wherein the thermal distribution layer has a higher thermal conductivity than a thermal conductivity of the heat source, wherein the thermal distribution layer is configured to transfer thermal energy from the heat source, which is in contact with the thermal distribution layer, to the plurality of adjacent heat transfer stacks and also configured to transfer thermal energy between the plurality of heat transfer stacks;

first electrodes positioned to apply an electric field across the first layer of the electrocaloric effect material of each heat transfer stack of the first subset and across the second layer of the electrocaloric effect material of each heat transfer stack of the second subset;

second electrodes positioned to apply an electric field across the first layer of the electrocaloric effect material of each heat transfer stack of the second subset and across the second layer of the electrocaloric effect material of each heat transfer stack of the first subset; and a controller operative to selectively control application of the electric field from a power source to the first electrodes and the second electrodes responsive to one or more of a plurality of clock signals, wherein:

the plurality of clock signals comprises two clock signals that are substantially out of phase with respect to one another;

the controller is configured to initiate application of the electric field to the first electrodes responsive to the first clock signal to initiate transfer of thermal energy with the second layer of the electrocaloric effect material of each heat transfer stack of the second subset and with the first layer of the electrocaloric effect material of each heat transfer stack of the first subset to effectively transfer thermal energy from the heat source and from the second subset via the thermal distribution layer;

the controller is configured to initiate application of the electric field to the second electrodes responsive to the second clock signal to initiate transfer of thermal energy with the second layer of the electrocaloric effect material of each heat transfer stack of the first subset and with the first layer of the electrocaloric effect material of each heat transfer stack of the second subset to transfer thermal energy from the heat source and from the first subset via the thermal distribution layer;

each heat transfer stack of the plurality of heat transfer stacks comprises a hexagonal shape;

the pattern includes rows of heat transfer stacks of the first subset that alternate with rows of heat transfer stacks of the second subset;

two opposite sides of the hexagonal shape of each heat transfer stack of the first subset are positioned to abut two heat transfer stacks of the first subset in a same row of heat transfer stacks of the first subset and four other sides of the hexagonal shape of each heat transfer stack of the first subset are positioned to abut four heat transfer stacks of the second subset in two adjacent rows of heat transfer stacks of the second subset; and two opposite sides of the hexagonal shape of each heat transfer stack of the second subset are positioned to abut two heat transfer stacks of the second subset in a same row of heat transfer stacks of the second subset and four other sides of the hexagonal shape of each heat transfer stack of the second subset are positioned to abut four heat transfer stacks of the first subset in two adjacent rows of heat transfer stacks of the first subset.

* * * * *

UNITED STATES PATENT AND TRADEMARK OFFICE
CERTIFICATE OF CORRECTION

| | | |
|---|---|---|
| PATENT NO. | : 9,671,140 B2 | Page 1 of 1 |
| APPLICATION NO. | : 13/384859 | |
| DATED | : June 6, 2017 | |
| INVENTOR(S) | : Kruglick | |

It is certified that error appears in the above-identified patent and that said Letters Patent is hereby corrected as shown below:

In the Specification

In Column 12, Line 29, delete "in formation system" and insert -- information system --, therefor.

In Column 13, Line 21, delete "arc" and insert -- are --, therefor.

In Column 13, Line 47, delete "machine Such" and insert -- machine. Such --, therefor.

In Column 13, Line 54, delete "machine The" and insert -- machine. The --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*